(No Model.)

C. J. RIES.
ATTACHMENT FOR HARNESS.

No. 419,075. Patented Jan. 7, 1890.

Charles J. Ries

Witnesses
G. S. Elliott
E. W. Johnson

Inventor
By his Attorney

UNITED STATES PATENT OFFICE.

CHARLES J. RIES, OF MADISONVILLE, KENTUCKY.

ATTACHMENT FOR HARNESS.

SPECIFICATION forming part of Letters Patent No. 419,075, dated January 7, 1890.

Application filed November 7, 1889. Serial No. 329,498. (No model.)

*To all whom it may concern:*

Be it known that I, CHARLES J. RIES, a citizen of the United States of America, residing at Madisonville, in the county of Hopkins and State of Kentucky, have invented certain new and useful Improvements in Attachments for Harness; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in harness attachments.

The object of the invention is to provide an attachment for harness which can be used for correcting vicious habits in horses or other animals—such as kicking, rearing, or running; and it consists in the combination of the parts, as will be hereinafter fully set forth, and particularly pointed out in the claim.

Figure 1:
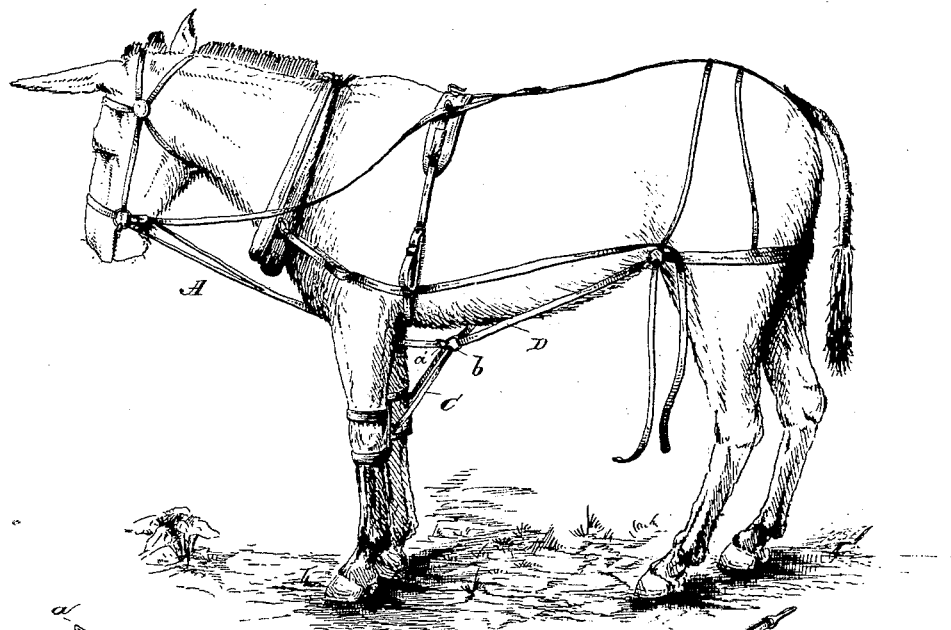
Figure 2:
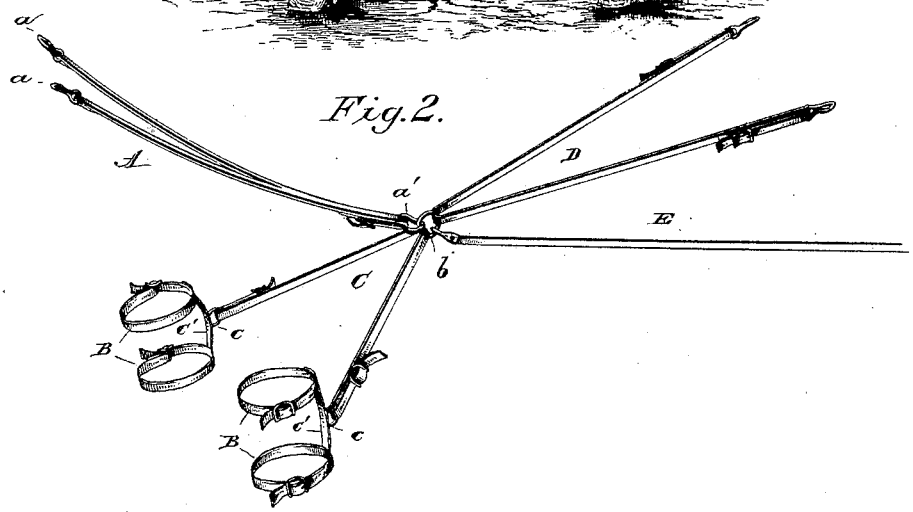

In the accompanying drawings, Figure 1 is a perspective view of my improved device, showing it applied to an animal. Fig. 2 is a similar view of the device detached.

My improved device is adapted to be used in connection with the ordinary harness provided with a breeching-strap.

A refers to a strap or martingale, which carries at its ends snap-hooks $a$ $a$, adapted to engage with the rings of the bridle. This martingale is split to provide two smaller straps and one larger one, the end of the larger one being provided with a buckle and keeper, so that it can be looped around a triangular link $a'$, said link engaging with a ring $b$. Through the ring $b$ passes a strap C, which is looped upon itself and provided with buckles, so that it can be properly adjusted, and the loop portions of this strap pass through rings $c$, which are attached to short pieces of leather $c'$, having riveted to the ends thereof loops B B, which are adapted to be placed above and below the knee-joint of the animal. Through the ring $b$ is passed a looped strap D, which is provided with snap-hooks for engaging with the rings of the breeching-strap, and by adjusting this strap D the forward movement of the legs of the animal can be limited. The strap or connection E is adapted to engage with the ring $b$, and is of sufficient length to extend to the vehicle, and by drawing upon this strap the movement of the animal can be controlled.

The martingale extending to the bridle prevents the horse raising his head, and thus prevents rearing, while other movements, such as running away, jumping, &c., can be prevented by drawing upon the strap E.

The hereinbefore-described device may also be used for hitching animals, and it is simple and effective, and can be adjusted to not interfere with the free movement of the horse while walking or trotting.

I am aware that prior to my invention it has been proposed to provide harness attachments, which are designed especially for breaking horses, with straps adapted to be connected to the legs of the animal and provided with other straps which extend to the vehicle, so that when drawn upon the movement of the horse can be controlled; also, that it is not new to provide a hitching device or hopple with straps which extend around the legs of an animal above and below the knee-joint to the breeching; but

What I claim as new, and desire to secure by Letters Patent, is—

In an attachment for harness, the combination of the martingale or bifurcated strap A, provided at one end with an adjusting-buckle and at the ends of the bifurcated portion with hooks for engaging the bridle-bit, a central ring, through which passes a looped strap C, said strap engaging with bands which encircle the legs of the animal above and below the knee-joint, a strap D extending from the central ring to the breeching, and a flexible connection E, also connected to the central ring, said straps A, B, C, and D being adjustable as to length, substantially as and for the purpose set forth.

In testimony whereof I affix my signature in presence of two witnesses.

CHARLES J. RIES.

Witnesses:
S. J. MITCHELL,
G. W. ASHLEY.